(12) United States Patent
Marko et al.

(10) Patent No.: US 6,834,156 B1
(45) Date of Patent: Dec. 21, 2004

(54) METHOD AND APPARATUS FOR CONTROLLING USER ACCESS AND DECRYPTION OF LOCALLY STORED CONTENT AT RECEIVERS IN A DIGITAL BROADCAST SYSTEM

(75) Inventors: Paul D. Marko, Pembroke Pines, FL (US); Craig P. Wadin, Sunrise, FL (US)

(73) Assignee: XM Satellite Radio, Inc., Washington, DC (US)

( * ) Notice: Subject to any disclaimer, the term of this patent is extended or adjusted under 35 U.S.C. 154(b) by 588 days.

(21) Appl. No.: 09/695,081

(22) Filed: Oct. 25, 2000

(51) Int. Cl.[7] ............................................. H04N 5/91
(52) U.S. Cl. .............................. 386/94; 386/46; 725/1
(58) Field of Search .......................... 386/94, 46; 725/1; 382/100; 455/66

(56) References Cited

U.S. PATENT DOCUMENTS

| | | | |
|---|---|---|---|
| 5,339,239 A | 8/1994 | Manabe et al. | 364/401 |
| 5,406,626 A | 4/1995 | Ryan | 380/50 |
| 5,491,838 A * | 2/1996 | Takahisa et al. | 455/3.06 |
| 5,524,051 A | 6/1996 | Ryan | 380/9 |
| 5,539,635 A | 7/1996 | Larson, Jr. | 364/401 R |
| 5,572,442 A | 11/1996 | Schulhof et al. | 364/514 C |
| 5,590,195 A | 12/1996 | Ryan | 380/9 |
| 5,732,324 A | 3/1998 | Rieger, III | 455/3.1 |
| 5,751,806 A | 5/1998 | Ryan | 380/9 |
| 5,809,144 A | 9/1998 | Sirbu et al. | 380/25 |
| 5,809,472 A | 9/1998 | Morrison | 704/500 |
| 5,815,671 A | 9/1998 | Morrison | 395/200.77 |
| 5,819,049 A | 10/1998 | Rietmann | 395/200.69 |
| 5,889,860 A | 3/1999 | Eller et al. | 380/4 |
| 5,914,941 A | 6/1999 | Janky | 370/313 |
| 5,917,873 A * | 6/1999 | Shiomoto et al. | 375/376 |
| 5,945,988 A * | 8/1999 | Williams et al. | 345/747 |
| 5,995,155 A * | 11/1999 | Schindler et al. | 348/461 |

* cited by examiner

*Primary Examiner*—Chris Kelley
*Assistant Examiner*—Alicia M. Duggins
(74) *Attorney, Agent, or Firm*—Roylance, Abrams, Berdo & Goodman, L.L.P.

(57) ABSTRACT

The invention relates generally to a receiver unit in a digital broadcast system for receiving a broadcast signal comprising content segments and control data, and generating an output signal using the content segments and previously stored content segments at the receiver. The previously stored content segments are decrypted. The receiver is configured to obtain authorization from a remote distribution center to decrypt locally stored content segments requested by a user for recording onto a portable storage medium.

15 Claims, 5 Drawing Sheets

METHOD AND APPARATUS FOR CONTROLLING USER ACCESS AND DECRYPTION OF LOCALLY STORED CONTENT AT RECEIVERS IN A DIGITAL BROADCAST SYSTEM

CROSS REFERENCE TO RELATED APPLICATIONS

Related subject matter is disclosed and claimed in co-pending U.S. patent application Ser. No. 09/695,226 of Paul D. Marko et al filed even date herewith for "Method and Apparatus for Employing Stored Content at Receivers to Improve Efficiency of Broadcast System Bandwidth Use"; in co-pending U.S. patent application Ser. No. 09/695,228 of Paul D. Marko et al filed even date herewith for "Method and Apparatus for Implementing File Transfers to Receivers in a Digital Broadcast System"; in co-pending U.S. patent application of Paul D. Marko et al filed even date herewith for "Method and Apparatus for Prompting a Reverse Channel Response From a Receiver in a Digital Broadcast System"; in co-pending U.S. patent application Ser. No. 09/695,139 of Paul D. Marko et al filed even date herewith for "Method and Apparatus for Providing On-Demand Access of Stored Content at a Receiver in a Digital Broadcast System"; in co-pending U.S. patent application Ser. No. 09/388,926, filed by Hien D. Ma et al on Nov. 4, 1999; and in co-pending U.S. patent application Ser. No. 09/433,862, filed by Paul D. Marko et al on Nov. 4, 1999; all of said applications being expressly incorporated herein by reference.

FIELD OF THE INVENTION

The invention relates generally to an apparatus and method for providing users in a digital broadcast system with on-demand access to encrypted content that is stored locally at user receivers or is transmitted via said digital broadcast system, and with the ability to decrypt and subsequently store the content on portable storage media.

BACKGROUND OF THE INVENTION

Satellite digital audio radio service (SDARS), a satellite broadcast service established by the U.S. Federal Communications Commission (FCC), has been proposed using satellite transmission of digital audio programs to radio receivers. The radio receivers can be stationary receivers (i.e., with a receiver antenna pointed for optimal line of sight (LOS) reception from a satellite) or mobile receivers (e.g., a receiver that is hand-carried by a user or is mounted in a vehicle).

The type of content which can be distributed in an SDARS system or a similar digital broadcast system typically includes audio programs such as music recordings, advertisements, news programs and talk shows, among other audio programs, and data files. A significant amount of the content that is to be broadcast is predetermined prior to transmission such as popular songs. Radio stations, for example, frequently use play lists to determine how often a selected number of songs, which are identified as being most popular at a given point in time, are to be broadcast. Popular songs and other programs which can be repeated on a broadcast channel are in contrast to "live" commentary provided by a broadcast channel host, talk show host or other commentator, for example. Since bandwidth in a digital broadcast system is limited and valuable, efficient use of the bandwidth is desirable. A need therefore exists for a digital broadcast system wherein content is provided in a broadcast signal in an optimal manner to use bandwidth as efficiently as possible.

In addition, much of the content broadcast via a digital broadcast system is not available for purchase in conventional retail outlets. A need therefore also exists for a digital broadcast system which enables users to receive, purchase and store selected content in a broadcast data stream onto a personal storage device (e.g., a portable storage medium such as a compact disc, a digital audio tape (DAT) and the like). Accordingly, a need also exists for a method of preventing unauthorized use of broadcast content.

The afore-mentioned U.S. patent application Ser. No. 09/388,926 describes a system wherein a prepaid music card is used to decipher broadcast programs received substantially in real-time. In other words, a receiver is operable to buffer a selected amount of a program (e.g., the first two minutes of program reception). If the receiver determines that the beginning of the program has been captured in the buffer, the receiver proceeds to transfer the remainder of the received program to a storage device once the user has indicated that storage of the received program is desired. If the received program is encrypted, the music card is then debited when the received and stored program is decrypted and provided to a portable storage medium.

As stated previously, much of the audio program content transmitted in a broadcast signal is transmitted on a substantially repetitive basis (e.g., popular songs on play lists for repeat broadcast transmission throughout the day). As disclosed in the afore-mentioned U.S. patent application Ser. No. 09/695,226, such content can be stored locally with respect to the receiver to allow more efficient use of system bandwidth. In other words, the broadcast signal comprises an index for retrieving a locally stored audio program at a receiver, in lieu of providing the entire audio program in the broadcast signal. A need also exists for a digital broadcast system employing local storage of selected content at receivers which allows users to purchase and decrypt any of the locally stored content that is encrypted, and to store the decrypted content onto a portable storage medium.

SUMMARY OF THE INVENTION

The above described disadvantages are overcome and a number of advantages are realized by a digital broadcast system wherein receivers are provided with local storage devices for storing selected content (e.g., audio programs). The receivers are configured to receive the broadcast signal and to generate an output signal for playback via a loudspeaker, for example, using content transmitted in the broadcast signal or by accessing and retrieving from said local storage device previously stored content segments that were identified in the broadcast signal.

In accordance with another aspect of the present invention, receivers are provided with means for connecting to a distribution center via a reverse channel to obtain authorization to decrypt selected stored content. The receivers are configured to allow users to indicate when content transmitted in or identified in the broadcast signal are desired to be purchased, decrypted and downloaded to a portable storage medium.

BRIEF DESCRIPTION OF DRAWINGS

The various aspects, advantages and novel features of the present invention will be more readily comprehended from the following detailed description when read in conjunction with the appended drawings, in which.

DETAILED DESCRIPTION OF THE PREFERRED EMBODIMENTS

Figure 1:
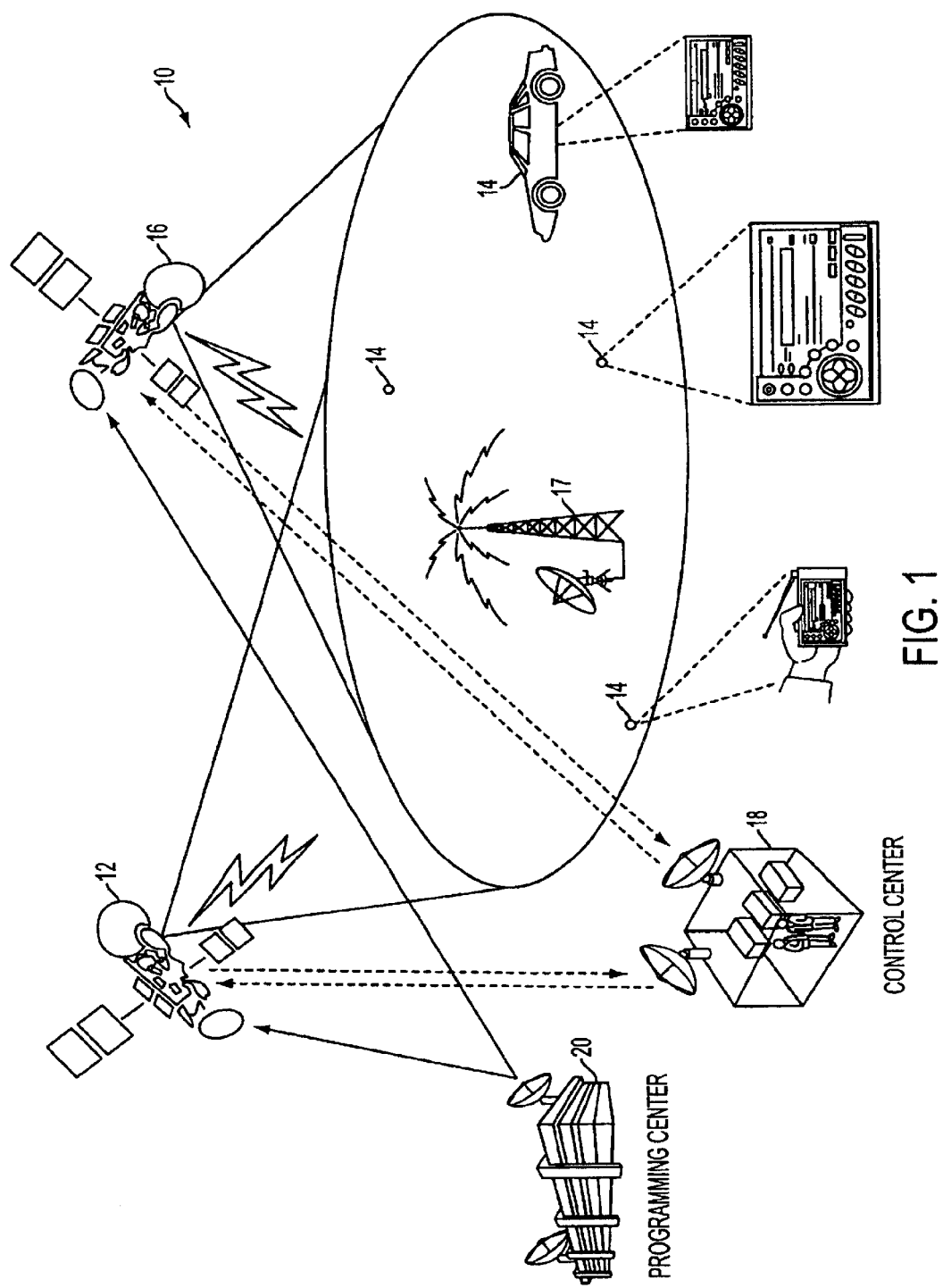
FIG. 1 illustrates an SDARS system constructed in accordance with an embodiment of the present invention.

FIG. 1 depicts a satellite broadcast system 10 which comprises at least one geostationary satellite 12, for example, for line of sight (LOS) satellite signal reception at receiver units indicated generally at 14. The satellite broadcast system 10 can be used for SDARS, for example. Another geostationary satellite 16 at a different orbital position is provided for diversity purposes. One or more terrestrial repeaters 17 can be provided to repeat satellite signals from one of the satellites in geographic areas where LOS reception is obscured by tall buildings, hills and other obstructions. It is to be understood that different numbers of satellites can be used, and satellites in other types of orbits can be used. Alternatively, a broadcast signals can be sent using only a terrestrial transmission system.

Figure 2:
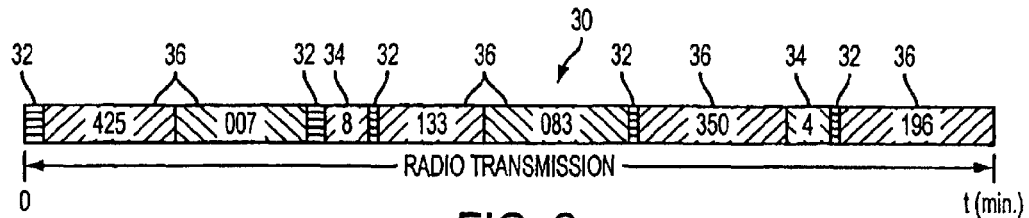
FIG. 2 illustrates an exemplary radio broadcast transmission.

As illustrated in FIG. 1, a receiver unit 14 can be configured for stationary use (e.g., on a subscriber's premises), or mobile use (e.g., portable use or mobile use in a vehicle), or both. A control center 18 is provided for telemetry, tracking and control of the satellites 12 and 16. A programming center 20 is provided to generate and transmit a composite data stream via the satellites 12 and 16 which comprises a plurality of payload channels. One of the payload channels 30 is depicted in FIG. 2 for illustrative purposes. The system 10 can broadcast a composite data stream generated, for example, by multiplexing a plurality of payload channels 30. The receivers are therefore configured to demultiplex a received composite data stream to playback a selected one of the payload channels.

The programming center 20 is configured to obtain content from different sources and providers which can comprise both analog and digital information such as audio, video, data, program label information, auxiliary information, and so on. For example, the programming center 20 can provide SDARS having on the order of 100 different program channels to transmit different types of music programs (e.g., jazz, classical, rock, religious, country, and so on) and news programs (e.g., regional, national, politic financial and sports). The SDARS can also provide emergency information, travel advisory information, educational programs, and the like.

The types of content to be provided in a payload channel is determined manually or automatically via a computer, based on contractual and financial arrangements with information providers, and demographic and financial decisions determining the types of programming to be provided via the programming center 20. In addition, a payload channel 30 can comprise plural service components to provide a plurality of different services. For example, a number of service components in a payload channel can be related to the same service and can include an audio component and a video and/or a digital data stream comprising auxiliary information, or another audio component to insert advertising information relating to the audio or video program.

With continued reference to FIG. 2, an exemplary payload channel 30 is shown which provides a radio broadcast transmission to the receivers 14. The radio broadcast transmission comprises a number of content segments corresponding to live talk 32 by a program channel host (e.g., disc jockey), prerecorded commercials 34 and prerecorded musical selections 36. In accordance with an aspect of the present invention, receivers 14 are configured to access and playback locally stored content segments such as prerecorded commercials 34 and musical selections 36 to reduce the amount of bandwidth required for a radio broadcast transmission, for example. The locally stored content segments can include prerecorded music selections, advertisements, news programs, and the like. Some of the locally stored content segments are encrypted to prevent their unauthorized storage and distribution. The present invention provides means for purchasing or otherwise obtaining authorization to decrypt and use locally stored content (e.g., to store on a personal memory device such as DAT, memory stick, CD-ROM, and so on).

Figure 3A:
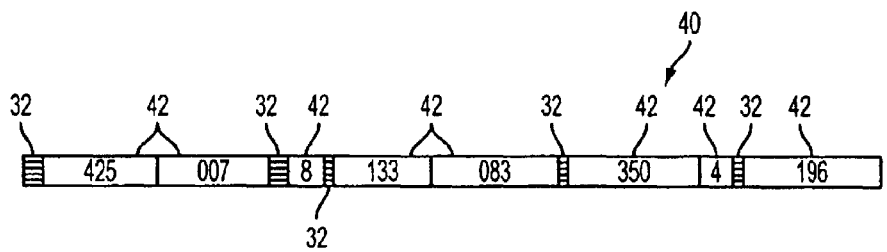
FIGS. 3A, 3B and 3C illustrate, respectively, an exemplary radio broadcast transmission, stored content, and a receiver output signal generated in accordance with an embodiment of the present invention.
Figure 3B:
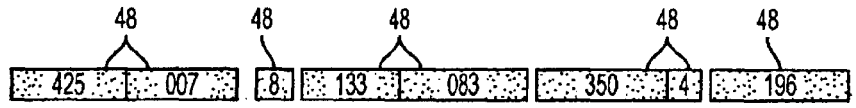
Figure 3C:
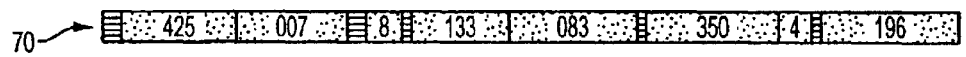

With reference to FIG. 3A, a payload channel 40 is generated via the programming center 20 to transmit live talk segments 32 and data 42 which provides instructions to receivers 14 to playback selected ones of locally stored content segments. The data 42 preferably comprises identifiers for locally stored content segments and progress data. When generating an output signal from the received payload channel 40, a receiver 14 uses the identifiers (e.g., "425", "007", "8", and so on) to access and retrieve corresponding content segments from a local storage device, as indicated in FIG. 3B. The receiver 14 uses the progress data to determine when to playback the retrieved content segments with respect to the broadcast live content segments 32 in the payload channel 40. For example, the progress data can indicate the current time index in a content segment at a particular point in time during the transmission and playback of a payload channel. Accordingly, the progress data facilitates the generation of an output signal from the received payload channel 40 which is perceived by users as being a continuous composite data stream that was broadcast with retrieved content segments therein, as indicated in FIG. 3C.

Figure 4A:
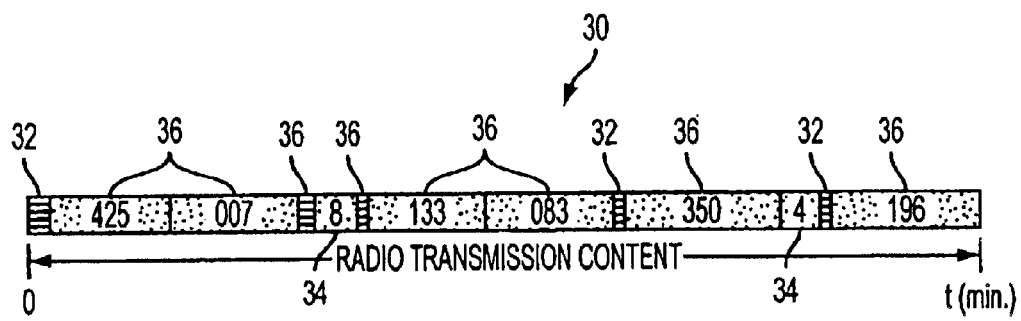
FIGS. 4A, 4B, 4C and 4D relative instantaneous bandwidth requirements for an exemplary broadcast transmission and a broadcast transmission generated in accordance with the present invention.
Figure 4B:
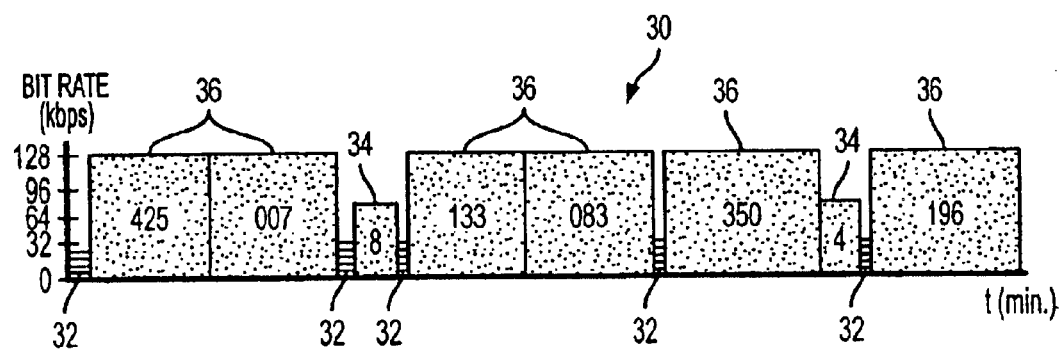
Figure 4C:
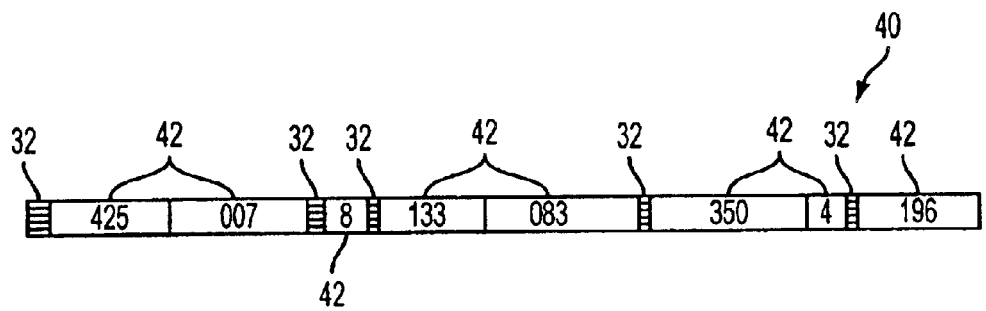
Figure 4D:
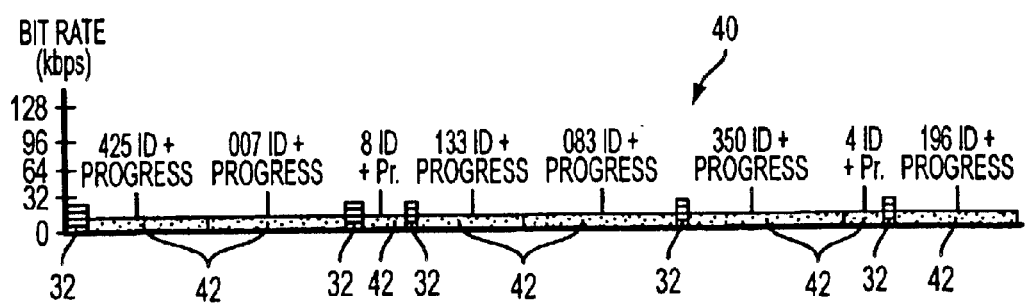

The advantages of the present invention will now be discussed with reference to FIGS. 4A through 4D. FIGS. 4B and 4D contrast the instantaneous bandwidth requirements over time of the payload channels 30 and 40, respectively, in FIGS. 4A and 4C. As stated previously in connection with FIG. 2, the payload channel 30 is an exemplary radio broadcast transmission. As indicated in FIG. 4B, the instantaneous bandwidth requirement varies based on the content segment. Musical selections 36 (e.g., segments "425", "007", "133", "083", "350" and "196") use significantly more bandwidth per content segment than "live" content segments 32 comprising dialogue. Prerecorded advertisements 34 generally use more instantaneous bandwidth than the "live" content segments 32 but less bandwidth than musical recordings 36. Thus, bandwidth efficiency can be increased if content segments such as musical recordings 36 can be stored at the receivers 14. The transmission bandwidth requirement to provide a musical recording to a user via a receiver 14 is therefore reduced, as evident from FIG. 4D, when a content segment index or identifier and progress data 42 is transmitted in lieu of the corresponding content segment, as shown in FIG. 4C.

Figure 5:
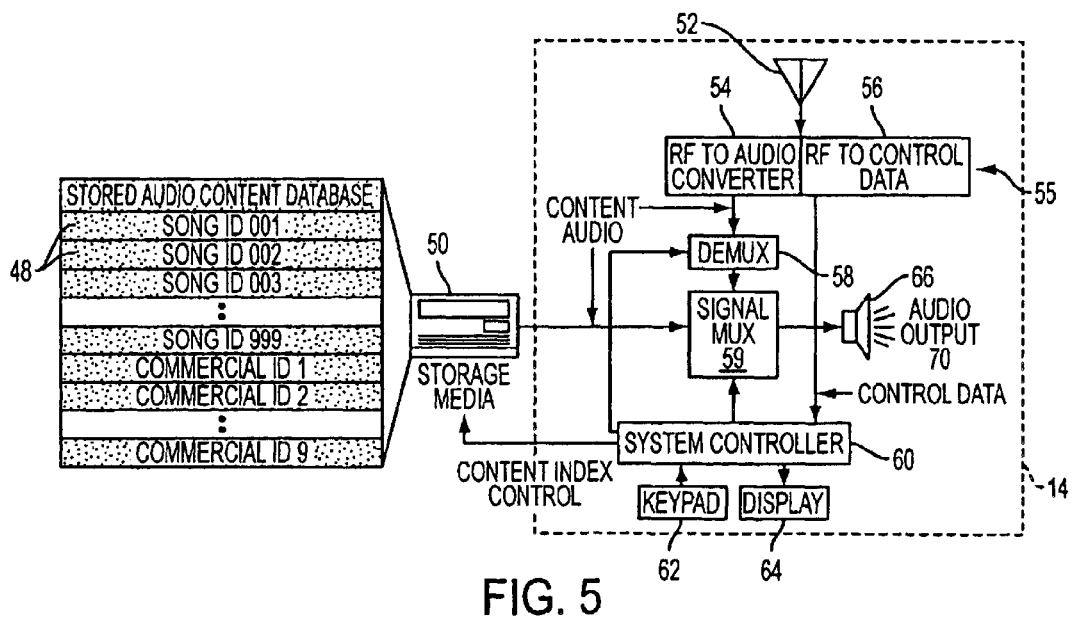
FIG. 5 is a block diagram of a receiver constructed in accordance with an embodiment of the present invention.

FIG. 5 illustrates an exemplary receiver 14 with a local storage device 50. The local storage device 50 can be any memory device that can store information in a digital format and can include, but is not limited to, a floppy disc, a hard disk, a compact disc (CD), a digital video disc (DVD), an optical disc, random access memory (RAM), a FLASH memory, a disk pack, digital audio tape (DAT), or other medium for storage and retrieval of digital information. The local storage device 50 can be provided within a receiver 14 chassis or connected externally thereto. Selected content segments 48 are stored in the local storage device, along with associated index information (e.g., unique identifiers).

With continued reference to FIG. 5, the receiver 14 comprises an antenna 52 for receiving a broadcast signal from at least one of the satellites 12 and 16 and/or a terrestrial repeater 17. As stated previously, the broadcast signal can originate from only a terrestrial transmission system. A converter 55 is preferably provided which is operable to perform radio frequency (RF) downconversion, and any demodulation, synchronization, demultiplexing, de-interleaving and decoding functions performed as part of the transport layer at a broadcast station in the system 10, and described in the afore-mentioned application Ser. No. 09/433,862, to obtain the baseband payload channels from the broadcast composite data stream. The receiver 14 comprises a controller 60 connected to a display 64 and keypad 62 to allow a user to select a payload channel, among other operations. In response to the user program channel selection, the controller 60 provides control signals to a demultiplexer 58 to select the corresponding payload channel for output via a loudspeaker 66 or other output device (e.g., a display or monitor).

The converter 55 comprises an RF-to-audio converter 54 and an RF-to-control data converter 56 to extract, respectively, the content segments 32 and the control data 42 from a selected payload channel 40 in the received signal. The content segments 32 are preferably provided to the output device 66 via a signal multiplexer 59 as soon as they are received and processed via the converter 55 and demultiplexer 58. The extracted control data 42 is provided to the controller 60 which generates control signals for the signal multiplexer 59 and the local storage device 50. The control signals provided to the local storage device 50 indicate which of the stored content segments 48 stored in the local storage device 50 are to be accessed and retrieved in accordance with the control data. The control signals provided to the signal multiplexer 59 from the controller 60 indicate when retrieved content segments are to be provided in the output signal in accordance with the current time index provided in the control data 42 for the corresponding retrieved content segment.

The content segments 48 stored in the local storage device 50 can be updated via any of a number of different methods. For example, a broadcast signal can be provided to the controller 60 for controlling the storage device 50 to delete selected content segments stored therein, to replace selected content segments with different segments transmitted in the broadcast signal, as well as to add new segments transmitted in the broadcast signal. Instructions for updating the storage device 50 and corresponding content segments can also be provided via an application provided on a portable storage medium, or downloaded from a terrestrial communication network.

In accordance with the present invention, the receiver 14 is also provided with a decryption unit 80, a recording device 84 (e.g., a DAT recorder, an optical disc read/write device, and so on) for recording onto a portable storage medium and an optional signal reformat/external interface device 82 for connecting the output of the decryption unit 80 to an input on the recording device 84. The decryption and controlled access operations of the receiver 14 will now be described with reference to FIGS. 6 and 7.

Figure 6:
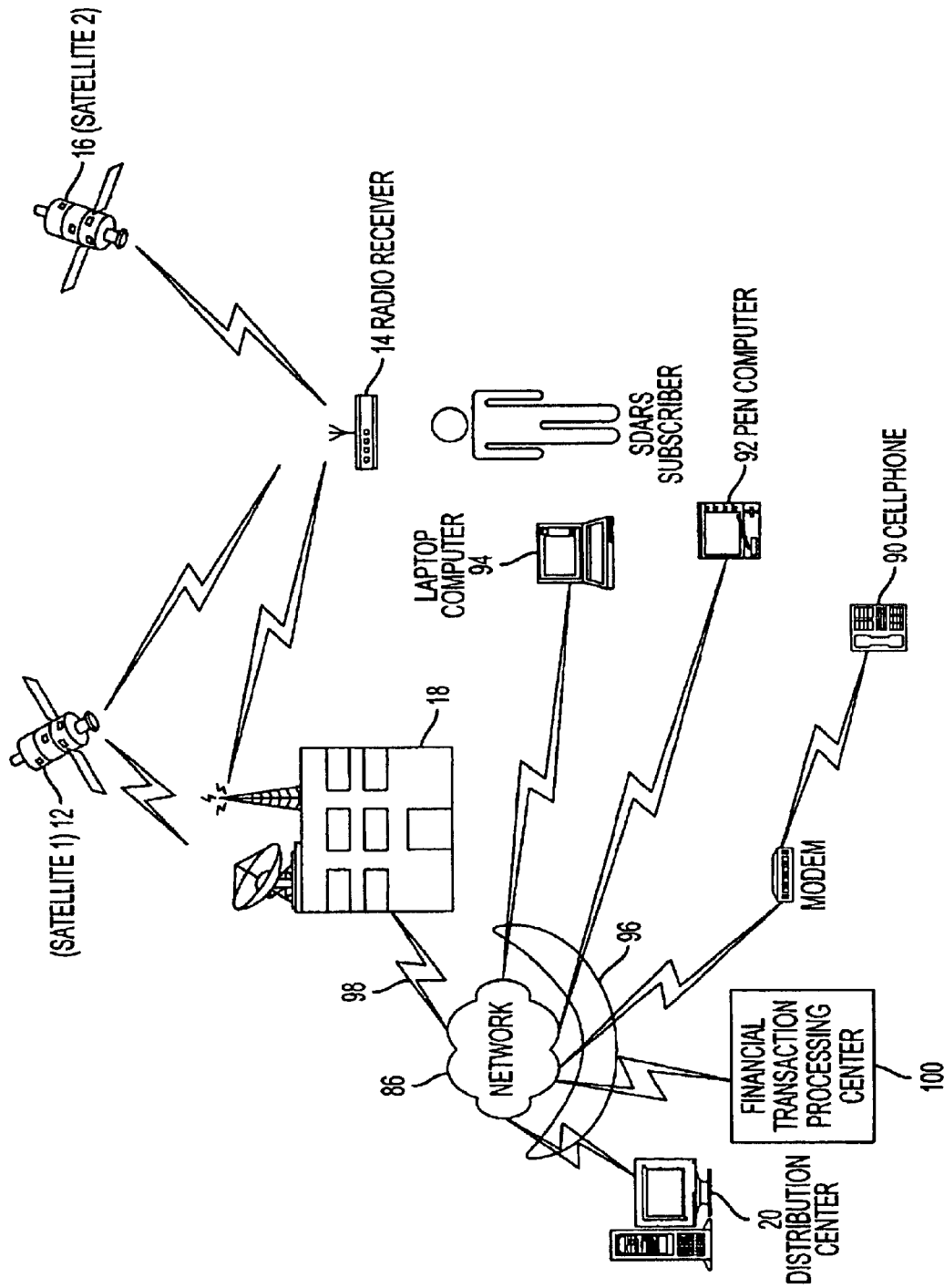
FIG. 6 illustrates an SDARS system constructed in accordance with an embodiment of the present invention to have a back channel to allow users to request decryption of selected encrypted broadcast content.

As shown in FIG. 6, an SDARS user can transmit a request signal for decryption of locally stored and encrypted content and subsequent storage of the decrypted content to the programming center 20, or to a distribution center or other SDARS service center which can be the same as or separate from the programming center. The request signal can be sent via a network 86 that is separate from the satellite broadcast system 10. For example, the user can notify a distribution center of broadcast programs or content segments that he desires to purchase via a telephone (e.g., a cellular telephone) 90, a personal data assistant 92, a personal or laptop computer 94 and the like. The communication link from the user to the distribution center is hereinafter referred to generally at 96. The request is generally initiated in response to the user hearing the desired audio program being output from the receiver as part of a received broadcast signal. It is to be understood, however, that the receiver can be configured to allow a user to request and obtain authorized access to locally stored content without first receiving and playing back a broadcast program comprising the desired content.

Figure 7:
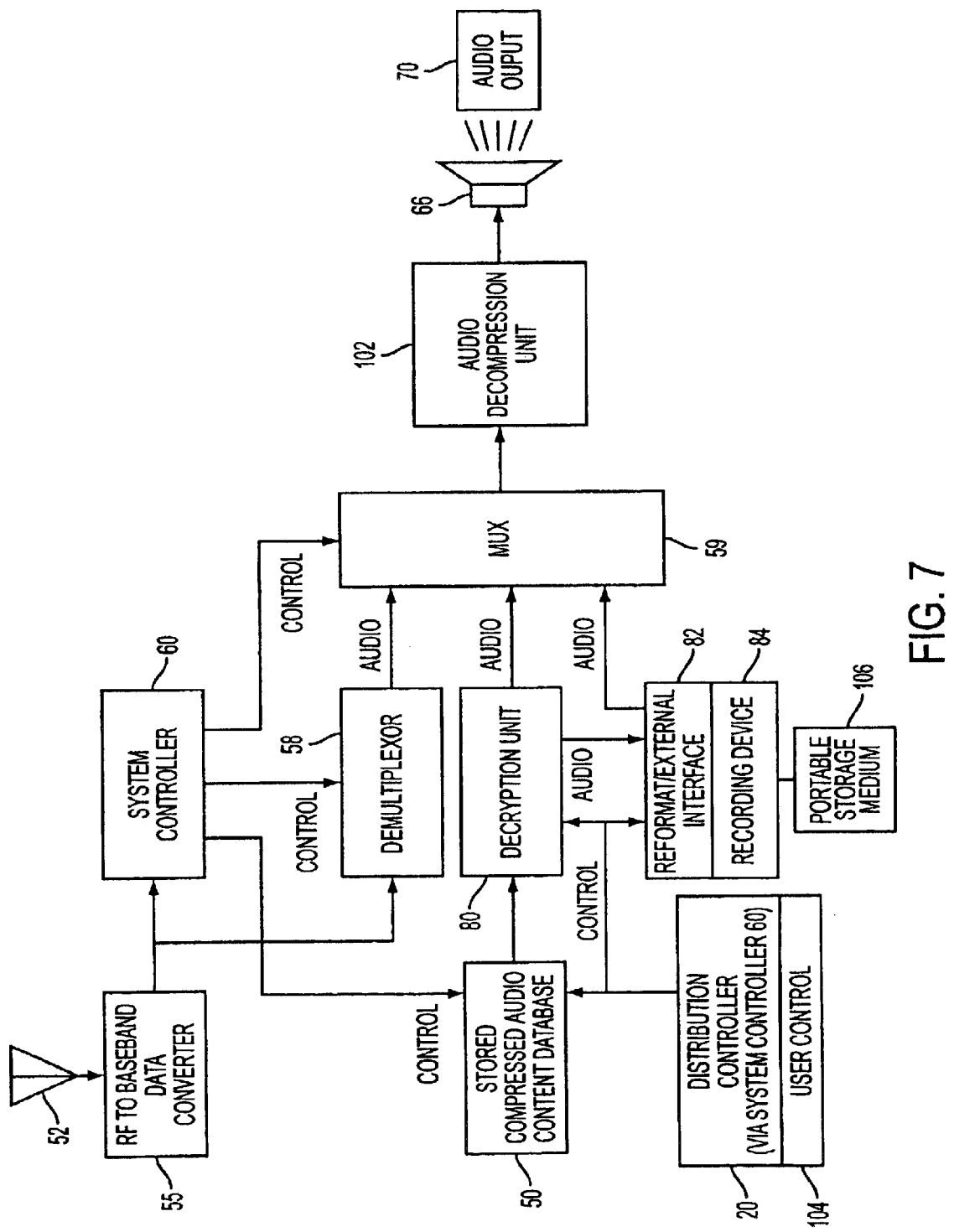
FIG. 7 is a block diagram of a receiver constructed in accordance with an embodiment of the present invention Throughout the drawing figures, like reference numerals will be understood to refer to like parts and components.

With continued reference to FIG. 6, when a request is received to transfer locally stored content to a portable storage medium, the distribution center 20 transmits control information to the system controller 60 using a preferably wireless communication link For example, the distribution center 20 can send a message to the corresponding receiver using one of the channels in the composite data stream, as indicated at 98 in FIG. 7. In other words, the composite data stream can comprise channels having messages that are addressed to a specific receiver (e.g., a header is provided with a unique identification code assigned to the receiver to enable the receiver to analyze and store packets in the received data stream that are intended for reception by the receiver and to discard packets that are not addressed to the receiver). The received packets can then be used by the system controller 60 to select the requested content from the local storage device 50 (e.g., using the corresponding identifiers for the requested content) and to route the requested content that has been retrieved from the local storage device 50 to the decryption unit 80.

The system controller 60 is also preferably operable to enable the decryption unit 80. After decryption of the requested content is complete, the requested content is provided to the signal reformat/external interface device 82 which reformats the data for output to a recording device 84 for storing the decrypted content on a portable storage device 42. The reformat/external interface 82 can be selected, depending on the type of recording device that is used. For example, the selection of a reformat/external reference interface 82 can be a user configurable option (e.g., one reformat/external interface 82 is configured to interface with different recording devices such as DAT or optical disc) or can be determined at time of manufacture and configured for a particular format.

As discussed above, the receiver 14 preferably allows playback of locally stored content based on broadcast signaling. The receiver can be provided with a button or other input device which the user can depress when he hears a broadcast program that he likes and wishes to purchase. The system controller 60 can then initiate a communication link to the distribution center. For example, the receiver 14 can be provided in a vehicle that is telematics-enabled. Thus, a signal from the system controller 60 in the receiver 14 can be used to initiate a call to the distribution center via a cellular telephone in the vehicle that is also telematics-enabled. Alternatively, the receiver can be configured to send the user request to the distribution center via a pager, among other communication devices. As stated above, the user can also manually initiate a telephone call or page or other communication link with the distribution center.

The distribution center is preferably operable to manage a payment transaction to allow the user to purchase the service of decrypting and recording locally store and encrypted content. For example, the user can use a memory stick or smart card with a corresponding card slot provided at the receiver to pay a required fee. The smart card or memory stick can be used for subsequent billing settlement. Alternatively, a card with a magnetic strip or integrated circuit memory having a prepaid monetary amount stored thereon can be used. The fee can be predetermined or can be provided to the system controller 60 by the distribution center via a message to the receiver transmitted in the broadcast data stream. By way of another example, the distribution center can also coordinate payment for the requested content via a financial transaction processing center 100 via the network.

The block diagram of FIG. 7 further illustrates a receiver 14 configured to enable a user to purchase, decrypt and record locally stored content. Identical components in FIGS. 5, 6 and 7 are described using the same corresponding reference numerals. As shown in FIG. 7, the system controller 60 provides control signals to the local storage device 50, the demultiplexer 58 and the multiplexer 59. Thus, an audio program on a selected broadcast channel in the received composite data stream can be output via the output device 66. An audio decompression unit 102 can be provided to decompress any compressed audio program components. If the selected channel is sending an audio program in its entirety, the demultiplexer 58 extracts the packets therefor and sends them to the multiplexer 59. If the audio program is comprised of locally stored content to conserve system bandwidth, the system controller 60 sends the stored content segment identifiers in the broadcast channel to the local storage device 50 to retrieve and output them via the decryption unit 80 and the multiplexer 59 in accordance with the progress data. If the user wishes to purchase the stored content that he is listening to, he can use a user control input device 104 (e.g., a button on the receiver) or a cellular telephone, pager or other device to contact the distribution center 20. The distribution center 20, in turn, controls the retrieval decryption and recording of the selected locally stored content by sending control signals to the local storage device 50, the decryption unit 80, the reformat/external interface 82 and the recording device 84 via the system controller 60 to record the decrypted content onto a portable storage medium 104. As stated above, authorization from the distribution center to decrypt and record locally stored content can be sent via the digital broadcast system. Alternatively, the control signals can be sent to the system controller 60 from a telematics-enabled device such as a cellular telephone, paper, laptop computer, personal data assistant or other device. The present invention is advantageous, among other reasons, because a two-way back channel is provided between receivers and a service center and used for transaction purposes, while content is transmitted more efficiently and inexpensively via a one-way broadcast link covering a significant geographic area.

Although the present invention has been described with reference to a preferred embodiment thereof, it will be understood that the invention is not limited to the details thereof. Various modifications and substitutions will occur to those of ordinary skill in the art. All such substitutions are intended to be embraced within the scope of the invention as defined in the appended claims.

What is claimed is:

1. A receiver in a digital broadcast system comprising:
   a memory device for storing locally stored content, said locally stored content being preselected by a programming center for playback with broadcast program content transmitted via the digital broadcast system, at least a portion of said locally stored content being encrypted;
   a decryption device connected to said memory device for decrypting said locally stored content received therefrom that is encrypted;
   an output device connected to said decryption device for playing back said locally stored content and the broadcast program content;
   a communication interface for receiving a broadcast signal from said digital broadcast system, said broadcast signal comprising data for identifying segments of said locally stored content for use in a broadcast program being played back via said output device;
   a device for generating a request signal to request retrieval and decryption of at least a portion of said locally stored content in response to a user input, and for initiating a communication link to a remote distribution center in said digital broadcast system, said distribution center being operable to authorize decryption of requested said locally stored content and to send an authorization signal to said receiver;
   a recording device connected to said decryption device; and
   a processing device connected to said memory device, said decryption device and said recording device and programmable to use said data to control the retrieval and playback of said segments with broadcast program content in the broadcast signal as the broadcast program is being played back via said output device, and to respond to said authorization signal to retrieve and decrypt and record at least a portion of said selected locally stored content onto a portable storage medium using said recording device.

2. A receiver as claimed in claim 1, wherein said device for generating a request signal is a button on said receiver, said processing device being programmed to respond to a signal generated when said button is activated by said user by initiating said communication link.

3. A receiver as claimed in claim 2, wherein said receiver is telematics-enabled and configured for connection to other telematics-enabled devices via a telematics bus, said other telematics-enabled devices being selected from the group consisting of a telephone, a cellular telephone, a pager, a personal computer, a laptop computer, and a personal data assistant, said processing device being programmed to initiate said communication link by transmitting a control signal via said telematics bus to at one of the other telematics-enabled devices, said communication link corresponding to a link between said one of the other telematics-enabled devices and said distribution center.

4. A receiver as claimed in claim 1, wherein said device for generating a request signal is selected from the group consisting of a telephone, a cellular telephone, a pager, a personal computer, a laptop computer, and a personal data assistant.

5. A receiver as claimed in claim 1, wherein said distribution center is operable to transmit said authorization signal to said receiver via said digital broadcast system.

6. A receiver as claimed in claim 1, wherein said device for generating a request signal is telematics-enabled and said receiver is configured for connection to other telematics-enabled devices via a telematics bus, said other telematics-enabled devices being selected from the group consisting of a telephone, a cellular telephone, a pager, a personal computer, a laptop computer, and a personal data assistant, said device for generating a request signal being operable to initiate said communication link by transmitting a control signal via said telematics bus to at one of the other telematics-enabled devices, said communication link corresponding to a link between said one of the other telematics-enabled devices and said distribution center.

7. A receiver as claimed in claim 6, wherein said processing device is said device for generating a request signal.

8. A receiver as claimed in claim 6, wherein said distribution center is operable to transmit said authorization signal to said one of the other telematics-enabled devices via said communication link for transmission to said processing device via said telematics bus.

9. A receiver as claimed in claim 1, further comprising a payment processing device connected to said processing device and configured to interface with at least one payment apparatus selected from the group consisting of a magnetic card, a smart card, and a memory stick and operable to perform at least one transaction selected from the group consisting of deducting a selected monetary amount from a prepaid amount stored on said payment apparatus and storing a monetary amount on said payment apparatus for later billing.

10. A method of decrypting content stored at a receiver in a digital broadcast system comprising the steps of:

storing locally stored content in a memory device connected to said receiver, said locally stored content being preselected by a programming center for playback with broadcast program content transmitted via the digital broadcast system, at least a portion of said locally stored content being encrypted;

receiving a broadcast signal from said digital broadcast system, said broadcast signal comprising data for identifying segments of said locally stored content for use with broadcast program content in a broadcast program as the broadcast program is being played back via an output device of said receiver;

using said data to control the retrieval and playback of said segments via said output device;

initiating a communication link to a remote distribution center in said digital broadcast system to request decryption of at least a portion of said locally stored content, said distribution center being operable to authorize decryption of requested said locally stored content and to send an authorization signal to said receiver; and responding to said authorization signal to retrieve and decrypt and record at least a portion of said selected locally stored content onto a portable storage medium using said recording device.

11. A method as claimed in claim 10, wherein said request signal is generated when a user depresses a button on said receiver.

12. A method as claimed in claim 10, wherein said initiating step comprises the step of establishing said communication link using at least one of a telephone, a cellular telephone, a pager, a personal computer, a laptop computer, and a personal data assistant.

13. A method as claimed in claim 10, wherein said receiver is telematics-enabled and configured for connection to other telematics-enabled devices via a telematics bus, said other telematics-enabled devices being selected from the group consisting of a telephone, a cellular telephone, a pager, a personal computer, a laptop computer, and a personal data assistant, said initiating step comprising the step of transmitting a control signal via said telematics bus to at one of the other telematics-enabled devices, said communication link corresponding to a link between said one of the other telematics-enabled devices and said distribution center.

14. A receiver as claimed in claim 1, wherein said user input is generated in response to the user hearing desired locally stored content output from the receiver as part of a received broadcast program.

15. A receiver as claimed in claim 14, wherein said user input is generated in response to the user requesting authorized access to locally stored content without first receiving and playing back a broadcast program comprising the desired locally stored content.

* * * * *